Jan. 18, 1944.  H. MOLOD  2,339,505
POULTRY DIPPING SYSTEM
Filed May 24, 1941
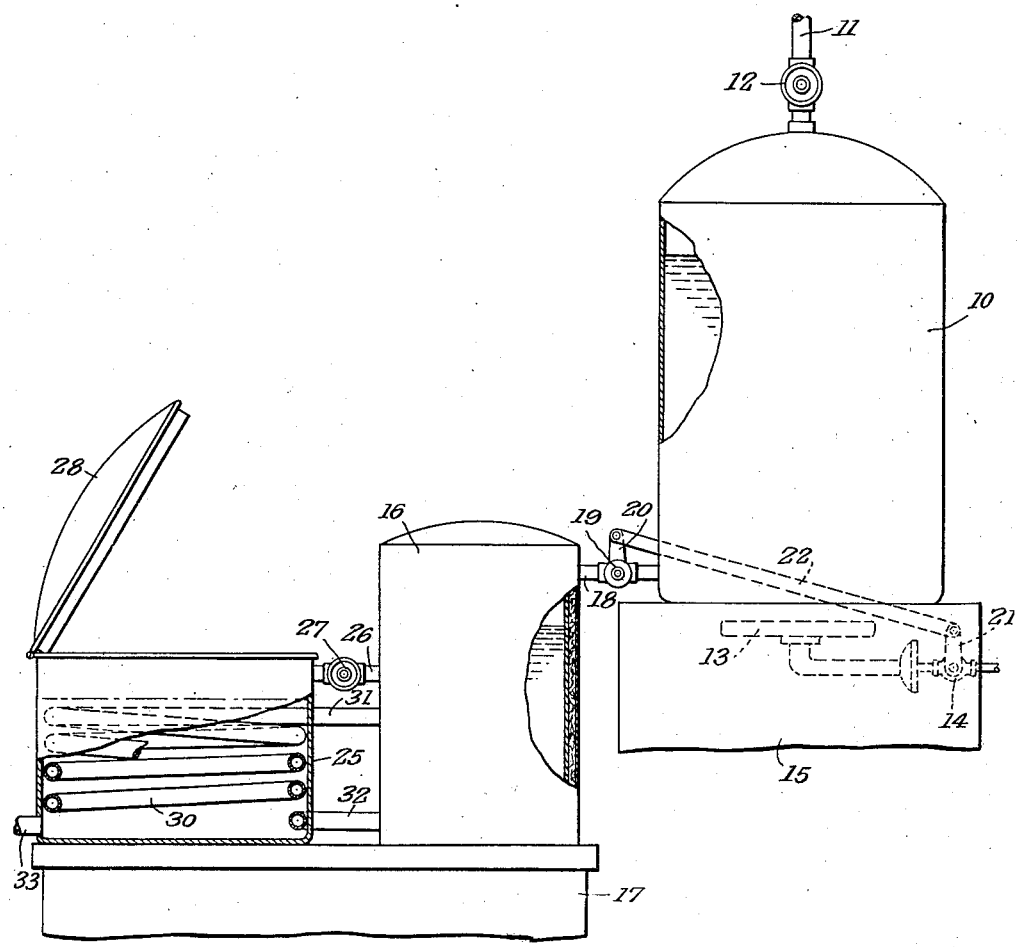
INVENTOR
HYMAN MOLOD
BY
ATTORNEY Patented Jan. 18, 1944

2,339,505

UNITED STATES PATENT OFFICE 2,339,505

POULTRY DIPPING SYSTEM

Hyman Molod, New York, N. Y.

Application May 24, 1941, Serial No. 394,961

7 Claims. (Cl. 17—11.2)

The present invention relates to apparatus for treating poultry preparatory to plucking and more particularly to a system of hot water supply for poultry dipping, preparatory to plucking, without rendering the poultry non-usable under the Jewish dietary laws.

In order to make the objects of the present invention more readily comprehensible by those not acquainted with Jewish dietary laws, a brief statement of such laws and the principles covering them is in order.

Under the Jewish law, as expressed in the Bible, the eating of blood is proscribed. In order to render the flesh of beast or fowl fit or "kosher" for use, the blood must be drawn off before use. This is done to the extent that it is effective, by soaking the meat or flesh of fowl in water for a certain period and thereafter covering, for a fixed period of time, the surface of the meat or flesh with a considerable amount of salt, to extract as much of the blood as possible, which is then washed off.

This soaking and salting must be done before cooking. For this reason, great difficulty has been encountered with respect to treating poultry with hot water to facilitate the plucking thereof, as conventionally practiced with non-kosher poultry. The objection has always been present that dipping in hot water might be executed by people who are ignorant or careless, in a manner equivalent to cooking, which would clot the blood and make impossible its removal or withdrawal. The Jewish rabbis have, therefore, formulated certain regulations as safeguards against these possibilities. They have forbidden the dipping of fowl in hot water in a vessel which is directly above the fire or even in such vessel after its removal from the fire until its temperature has fallen sufficiently to permit the insertion of a hand therein, which is a temperature far below that necessary to be effective for the purposes of loosening feathers. The rabbis have even forbidden the dipping of poultry or fowl in a secondary vessel into which water from a primary vessel, which was directly heated over the fire, has been poured, except under certain stringent emergencies.

The foregoing regulations have created a great many difficulties in the marketing of kosher-slaughtered poultry and have made impractical, particularly in large cities, the slaughtering, plucking and dressing of poultry at centralized points for distribution to local dealers. Instead, poultry is now generally distributed to numerous centers for slaughtering in accordance with the Jewish ritual and from these centers the slaughtered fowl are distributed, unplucked, to vastly more numerous local dealers such as butchers and chicken markets for sale to the consumers.

The disadvantages of such manner of marketing are several-fold. The bringing of unplucked fowl into numerous local stores where, frequently, other products are sold, raises problems of sanitation and has consequently been frowned upon by local health authorities, particularly as, frequently, the housewife takes unplucked fowl into her home, to be there plucked. Furthermore, the fowl even when plucked at a local dealer's place of business is generally purchased before it is plucked so that a housewife is unable to see just what she purchases and is frequently misled and fooled as to the quality of the poultry she pays for and it brings about the disposal, in the kosher markets, of all kinds and types of defective and low quality poultry.

It is the general object of the present invention to provide poultry dipping installations which will meet the conditions imposed by Jewish dietary laws. It is an object of the present invention to devise poultry dipping installations having a hot water supply system which will provide water of sufficient temperature to effectively loosen the feathers without technically precooking and rendering the poultry unfit under such dietary laws and regulations.

Another object of the present invention, is to provide poultry dipping installations which are practical for operation, economical to set up and use, and which may be readily adaptable for use at centralized points to enable and make possible the sale and distribution of kosher poultry plucked and in dressed form in a sanitary and economical manner.

Broadly stating, the present invention contemplates the provision of poultry dipping apparatus having a hot water supply system, consisting of primary and secondary tanks from which hot water may be supplied to the dipping tank at sufficiently high temperatures to be effective for loosening the feathers on a fowl.

The single figure of the drawing is a view in elevation and partly in section of one embodiment of a dipping tank and hot water supply system of the present invention. It is to be understood, however, that the embodiment of the figure, as shown, is more or less schematic, by way of illustration only, to make the principles and practice of the invention more readily comprehensible, and is not intended in any way to limit the scope of the invention to the exact details shown.

In the drawing, the numeral 10 designates a heating water or primary tank which may be of any conventional type and which is connected by inlet pipe, 11 and valve 12 to a water supply. The tank may rest on an elevated support 15, of any desired type, and may be associated with a source of heat such as the gas heater 13, connected to a gas supply and provided with a shut-off valve 14 or gas cock which is arranged below the tank 10.

A storage or intermediate tank 16 may be placed on another support 17, preferably at a lower level than the primary tank 10, so as to provide gravity flow from tank 10 to tank 16 through the connecting pipe 18, which is provided with a shut-off valve 19.

As an open valve 19 between tanks 10 and 16 during transfer of water, would connect the two tanks into one continuous vessel, continued heating of tank 10 by gas heater, 13 during such transfer, might render the combination of the two tanks a single primary vessel, and it is, therefore, desirable that the heat source be somehow removed or eliminated from tank 10 during such water transfer between the tanks. For that purpose, the valve 19 may be formed and operably connected to the gas valve 14 in a manner which will automatically shut the gas valve 14, as the valve 19 is being opened for water transfer. Naturally, the valves and connections must be so formed that the shutting off of the gas valve 14 is accomplished before the valve 19 begins to permit the passage of water.

While this effect may be obtained in many numerous ways that would readily suggest themselves to any skilled mechanic, and not thought necessary to be shown or discussed in detail, it may be generally stated that it can be readily accomplished by utilizing valves 19 and 14 of suitable types, which, may be respectively turned before and after reaching their operative positions to permit passage of material, and by connecting such valve by a suitable system of levers so that the turning of one to put it into operation to permit a flow of material would turn the other to stop the flow of material.

For example, valve 19 may be associated with a lever 20, and valve 14 with a lever 21, and the two levers connected by a link 22, so that each valve would operate when the other valve is turned. By connecting levers 20 and 21 to opposite sides of the respective valves, the respective valves may be caused to turn in opposite directions when their respective levers turn in the same direction so that valve 14 may be shut when valve 19 is opened.

Means may be provided to prevent gas leakage when the water flow between tanks 10 and 16 is shut off by closing the valve 19 and is then turned on again; such means not being thought necessary to be described or illustrated, as many of them will readily suggest themselves to any skilled mechanic. By way of example, however, it may be stated that one such means may comprise a pilot light adjacent the burner 13 in the manner as now found on one form of Bunsen burner which is readily available in the market.

It will be obvious that the formation and connection of valves 14 and 19 may be done in numerous ways which may be readily worked out by a skilled mechanic. As such details are not conceived of as an essential part of the present invention, they have not been thought to be necessary to be fully set forth and have been omitted except in a more or less diagrammatical way in the specification and drawing.

It will be further understood that any other method or system for eliminating the heat source from primary 10, for water transfer, may be employed. One such other system may comprise the automatic shifting of the heater, which may be pivoted for that purpose, from under the tank 10 by the opening of valve 19 in a manner that may also be readily worked out by any skilled mechanic.

The primary tank 10 may be of a substantially greater capacity than the tank 16 so that when the water in tank 16 is replenished from tank 10, considerable amount of water will remain in the latter, to maintain the temperature of the water in that when replenished, sufficiently high to be rapidly brought up again to the required temperature for further use.

A third or dipping tank 25 for the carrying out of the fowl dipping operation is provided, preferably alongside of tank 16. This tank 25 may be, preferably, of lesser capacity than tank 16, and so positioned relative to tank 16 that it could be filled therefrom by gravity. The filling may be done through a spout suitably provided on tank 16 but, preferably, through connecting pipe 26, provided with a shut-off valve 27. Tank 25 may also be provided with a cover or lid 23 to prevent the escape of heat when not in use.

Means for maintaining suitable temperature of the water in tank 25 for relatively longer periods of time may be provided which may consist of a heating coil 30 arranged on the interior of the tank 25 and connected to one of the tanks for the criculation of hot water therethrough. In the embodiment illustrated, the coil 30 is connected through lead pipes 31 and 32 to the tank 16. It will be readily understood that the temperature of the water in tank 16 will, generally, be higher than that of the water in tank 25, and that the coils 30 will, therefore, tend to continuously raise the temperature of the water in tank 25 to maintain it at an effective degree for a relatively longer period of time. It will be understood that the water in the coil will circulate through the tank 25 due to the effect of the cooling of the water in the coil which will create a current.

It will be readily understood that in practice, the water in the primary tank 10 may be brought to a boiling point or higher in a manner which is well known and that by suitable insulation of tank 16 the water therein may be kept at substantially the boiling point, so that it may be transferred therefrom at a sufficiently high degree of temperature into the dipping tank 25 which will be and continue, for a sufficiently long time, effective for loosening the feathers of the fowl dipped therein. Tank 25 may also be suitably insulated to retard the cooling of its contents.

Suitable draining means such as outlet 33 may be provided in the dipping tank, which may be connected to a sewage system or in the conventional manner.

It will be understood that the embodiment illustrated and described above is only one of numerous that may be devised for carrying out the spirit and purpose of the invention and that applicant, therefore, does not desire to be limited in the protection afforded him under the patent laws to the details of such embodiment, but that he should be protected to any embodiments or variations thereof which embody the spirit and intent of the invention, and which are within the scope of the claims hereto appended.

What I claim as my invention is:

1. Apparatus of the character described, including a water heating tank, heat supplying means for said water heating tank, a second tank connected to the said first tank, shut-off means between the said tanks, and means associated with the shut-off means for controlling the heat supply source for the water heating tank as said shut-off means is operated to connect the said two tanks, a fowl dipping tank connected to the said second tank, shut-off means between the said second tank and the said fowl dipping tank and a heating coil connected with the said second tank arranged within the said dipping tank.

2. Apparatus of the character described, including a water heating tank, heat supplying means for said water heating tank, a second tank connected to the said first tank, and arranged to be filled by gravity from the said heating tank, shut-off means between the said tanks, and means associated with the said shut-off means for controlling the heat supply source for the water heating tank as said shut-off means is operated to connect the said two tanks, a fowl dipping tank connected to the said second tank and arranged to be filled by gravity from the said second tank, shut-off means between the said second tank and the said fowl dipping tank and a heating coil connected with the said second tank arranged within the said dipping tank.

3. Apparatus of the character described, including a water heating tank, heat supplying means for said water heating tank, a second tank connected to the said first tank, shut-off means between the said tanks, and means associated with the said shut-off means for controlling the heat supply source for the water heating tank as said shut-off means is operated to connect the said two tanks and before such connection is made, a fowl dipping tank connected to the said second tank, and shut-off means between the said second tank and the said fowl dipping tank.

4. Apparatus of the character described, including a water heating tank, and a second tank connected to the said first tank, heating means for the said first tank, a shut-off valve between said tanks and means associated with the said shut-off valve for cutting off said heating means as said valve is operated for connecting said tanks.

5. Apparatus of the character described, including a water heating tank, and a second tank connected to the said first tank, heating means for the said first tank, a shut-off valve between said tanks and means associated with the said shut-off valve for cutting off said heating means as said valve is operated for connecting said tanks, and before such connection is made.

6. Apparatus of the character described, including a closed hot water tank, an open tank connected to the said closed tank, shut-off means between said tanks, and a coil arranged within said open tank and connected to the said closed tank to circulate water from said first tank within said coil in said open tank.

7. Apparatus of the character described, including a closed hot water tank, an open tank connected to the said closed tank and arranged to be filled by gravity therefrom, shut-off means between said tanks, and a coil arranged within said open tank and connected to the said closed tank to circulate water from said first tank within said coil in said open tank.

HYMAN MOLOD.